(12) United States Patent
Singh et al.

(10) Patent No.: US 12,065,992 B2
(45) Date of Patent: Aug. 20, 2024

(54) INTAKE RUNNER FOR GASEOUS FUEL ENGINE, SYSTEM, AND METHOD

(71) Applicant: Caterpillar Inc., Peoria, IL (US)

(72) Inventors: Jaswinder Singh, Dunlap, IL (US); Michael Bardell, Vail, AZ (US); Yongxian Gu, West Lafayette, IN (US); Eric L. Schroeder, Germantown Hills, IL (US); Patrick J. Seiler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/100,009

(22) Filed: Jan. 23, 2023

(65) Prior Publication Data

US 2024/0247622 A1 Jul. 25, 2024

(51) Int. Cl.
*F02M 21/02* (2006.01)

(52) U.S. Cl.
CPC .... *F02M 21/0281* (2013.01); *F02M 21/0206* (2013.01); *F02M 21/023* (2013.01); *F02M 21/0278* (2013.01)

(58) Field of Classification Search
CPC ........... F02M 21/0281; F02M 21/0206; F02M 21/023; F02M 21/0278
See application file for complete search history.

(56) References Cited

U.S. PATENT DOCUMENTS

| 7,047,934 | B1 | 5/2006 | Kawabe | |
|---|---|---|---|---|
| 7,487,750 | B2 | 2/2009 | Leone | |
| 7,980,220 | B2 | 7/2011 | Boyer | |
| 2011/0297128 | A1* | 12/2011 | Kim | F02D 19/0692 |
| | | | | 123/527 |
| 2016/0230730 | A1* | 8/2016 | Merchant | F02M 61/182 |

FOREIGN PATENT DOCUMENTS

| AT | 414025 B | * | 8/2006 | |
|---|---|---|---|---|
| CN | 107956604 A | * | 4/2018 | ......... F02M 21/0209 |
| EP | 0801223 A1 | * | 10/1997 | |
| IN | 283299 B | | 5/2017 | |
| JP | 2005155528 A | | 6/2005 | |
| JP | 2006188976 A | | 7/2006 | |
| JP | 6288131 B2 | | 3/2018 | |
| KR | 20190097253 A | * | 8/2019 | |
| KR | 102027498 B1 | | 10/2019 | |
| WO | WO2014053167 A1 | | 4/2014 | |

* cited by examiner

*Primary Examiner* — Hung Q Nguyen
(74) *Attorney, Agent, or Firm* — Brannon Sowers & Cracraft PC

(57) ABSTRACT

A gaseous fuel engine system includes a hydrogen fuel supply, an engine housing having an intake port extending to a cylinder, and an intake runner. The intake runner includes a valve mount attached to a conduit and having a valve mounting face, and a gaseous fuel admission valve is mounted upon the valve mounting face. A hydrogen fuel passage extends from the valve mount through the conduit and is oriented angularly to at least one of a clamping face of the intake runner or the valve mounting face. Related apparatus and methodology is also disclosed.

20 Claims, 4 Drawing Sheets

INTAKE RUNNER FOR GASEOUS FUEL ENGINE, SYSTEM, AND METHOD

STATEMENT OF GOVERNMENT INTEREST

This invention was made with government support under contract DE-EE0009422 awarded by DOE. The Government has certain rights in this invention.

TECHNICAL FIELD

The present disclosure relates generally to operating a reciprocating internal combustion engine on a gaseous hydrogen fuel, and more particularly to injecting a gaseous hydrogen fuel in an optimized manner to limit undesired combustion.

BACKGROUND

Internal combustion engines are well-known and widely used throughout the world for diverse purposes ranging from vehicle propulsion to operation of pumps and compressors and production of electrical power. A fuel is admitted into one or more cylinders of an engine and ignited to produce a controlled combustion reaction that drives a piston coupled to a crankshaft. All manner of fuel types and operating strategies have been utilized for well over a century.

In recent decades, increased regulatory and commercial attention has been given to reduction of certain emissions from conventional internal combustion engines. Liquid fuel engines operating on petroleum distillate fuels remain in widespread use and will likely remain so for the foreseeable future. Petroleum distillate fuels nevertheless can produce undesired amounts of oxides of nitrogen or NOx, particulate matter, and so-called greenhouse gases. Gaseous fuel engines utilizing, for example, natural gas can address some of these concerns particularly with regard to particulate emissions, but nevertheless can produce NOx, carbon dioxide, and carbon monoxide.

In an effort to further refine and manipulate emissions profiles of internal combustion engines, the use of gaseous hydrogen fuel as a primary fuel or a supplement to other gaseous fuels has been the subject of significant engineering efforts in recent years. Gaseous hydrogen fuel offers the promise of minimal undesired emissions. Hydrogen has a relatively low flammability limit, however, and a relatively fast flame speed in situ. For this reason, manufacturers have encountered numerous technical obstacles to successful implementation of gaseous hydrogen fuels, particularly in reciprocating piston engines. One example of a gaseous fuel engine having at least some capacity for operating on hydrogen is known from International Patent Application No. WO2014053167A1.

SUMMARY

In one aspect, a gaseous fuel engine system includes a gaseous hydrogen fuel supply, and an engine housing having formed therein a cylinder, and an intake port extending to the cylinder. The engine system further includes an intake runner having a conduit forming an intake passage fluidly connected to the intake port and extending from an upstream runner inlet to a downstream runner outlet. The conduit includes a clamping face extending around the downstream runner outlet. The intake runner further includes a valve mount attached to the conduit and including a valve mounting face. A hydrogen fuel passage extends from a passage inlet formed in the valve mount to a passage outlet. The hydrogen fuel passage is oriented angularly to a least one of the clamping face or the valve mounting face and extends from an upstream location of the passage inlet to a downstream location of the passage outlet. The gaseous fuel engine system further includes a gaseous fuel admission valve mounted upon the valve mount and fluidly connected to the gaseous hydrogen fuel supply.

In another aspect, an intake runner for a gaseous fuel engine includes a conduit having a manifold end for attaching to an intake manifold and an engine end for attaching to an engine, the conduit forming an intake passage defining an intake passage axis line extending between an upstream runner inlet formed in the manifold end and a downstream runner outlet formed in the engine end. The conduit further includes a clamping face located at the engine end and extending circumferentially around the downstream runner outlet. The intake runner further includes a valve mount attached to the conduit and including a valve mounting face, and a fuel passage extending between the valve mount and the engine end. The upstream runner inlet is centered on the intake passage axis line, and the downstream runner outlet is off-center from the intake passage axis line. The fuel passage defines a fuel passage axis extending through each of the clamping face and the valve mounting face, and oriented angularly to at least one of the clamping face or the valve mounting face.

In still another aspect, a method of operating a gaseous fuel engine system includes feeding a stream of pressurized intake air in an upstream to downstream direction through an intake passage formed by an intake runner fluidly connected to an intake port of a gaseous fuel engine. The method further includes energizing a gaseous fuel admission valve to admit a gaseous hydrogen fuel into a fuel passage extending though the intake runner, and injecting the gaseous hydrogen fuel into the stream of pressurized intake air via a fuel passage outlet defining an injection location. The method further includes conveying the injected gaseous hydrogen fuel through a plurality of intake openings into a cylinder in the gaseous fuel engine, and balancing a port residual fuel amount with a distribution pattern of a gaseous hydrogen fuel to the plurality of intake openings, based on the injection location. The method still further includes combusting the hydrogen fuel and the pressurized intake air in the cylinder.

DETAILED DESCRIPTION

Figure 1:
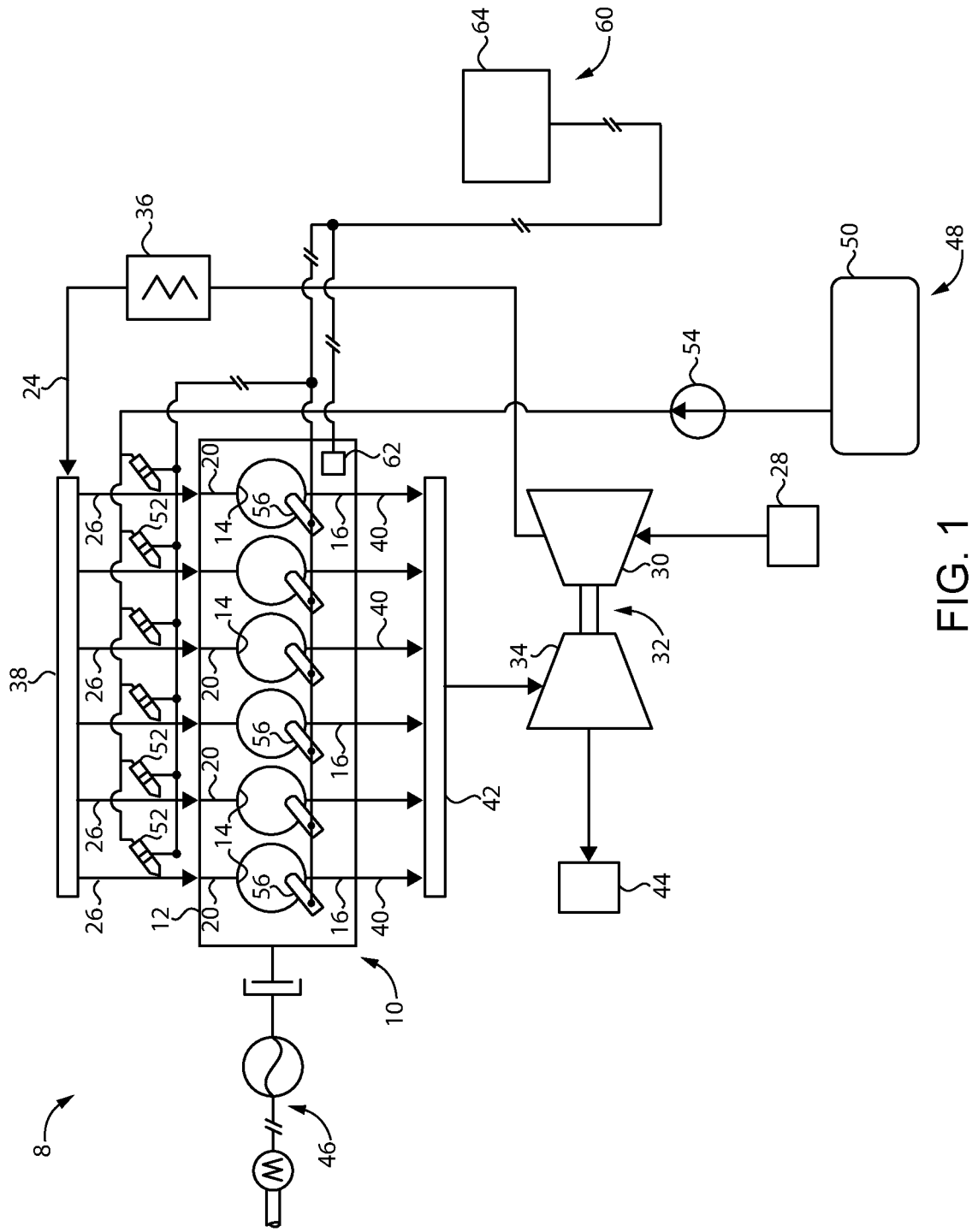
FIG. 1 is a diagrammatic view of a gaseous fuel engine system, according to one embodiment.

Referring to FIG. 1, there is shown a gaseous fuel engine system 8, according to one embodiment. Engine system 8 includes a gaseous fuel engine 10 having an engine housing 12 with a plurality of combustion cylinders 14 formed therein. Engine 10 may include any number of cylinders, including a total of one, in any suitable arrangement, such as an in-line pattern, a V-pattern, or still another. Engine 10 further includes a plurality of exhaust ports 16, within engine housing 12, a plurality of intake ports 20 within engine housing 12, along with exhaust valves and intake valves described in connection with subsequent figures.

Engine system 10 also includes an intake conduit 24 including a plurality of intake runners 26. Each intake runner 26 forms, together with a respective one of intake ports 20, a flow path conveying a flow of pressurized intake air to cylinders 14. Intake conduit 24 receives a flow of intake air from a fresh air inlet 28 that is compressed in a compressor 30 of a turbocharger 32. Turbocharger 32 includes a turbine 34. An aftercooler 36 may cool the pressurized intake air fed through intake conduit 24. An intake manifold 38 receives the flow of pressurized intake air and distributes the flow of pressurized intake air to intake runners 26, each in turn feeding the flow of pressurized intake air to one of intake ports 20 and thenceforth to one of cylinders 14. A plurality of exhaust runners 40 extend from cylinders 14 to an exhaust manifold 42. A flow of exhaust is passed through turbine 34 to rotate compressor 30, and thenceforth to an exhaust outlet 44. In some embodiments, aftertreatment equipment could be positioned to mitigate emissions in a flow of exhaust passed through exhaust outlet 44. In other instances, no aftertreatment of exhaust from engine 10 may be employed at all.

Engine system 8 further includes a fuel system 48. Fuel system 48 includes a gaseous hydrogen fuel supply 50. Gaseous hydrogen fuel supply 50 may contain gaseous molecular hydrogen in a pressurized state. In some instances, a gaseous hydrogen fuel may be fed to fuel system 48 from a supply conduit connecting to a reformer or another supply of a gaseous hydrogen fuel. Gaseous hydrogen fuels contemplated within the scope of the present disclosure can include gaseous molecular hydrogen as noted above, as well as various blends including gaseous hydrogen typically as a predominant constituent. In many instances gaseous fuel engine system 8 can be operated on substantially pure (100%) gaseous molecular hydrogen, natural gas, methane, ethane, biogas, as well as various blends of these. Fuel system 48 may further include at least one pump 54 that transfers gaseous hydrogen fuel, and typically increases a pressure of the gaseous hydrogen fuel to a desired injection pressure. Fuel system 48 also includes a plurality of fuel admission valves 52. Each fuel admission valve 52 will typically be coupled to one of intake runners 26 or to one of intake ports 20 at an injection location. Embodiments are nevertheless contemplated where gaseous hydrogen fuel is injected into intake manifold 38, or admitted elsewhere in engine system 8 including admission by way of fumigation, or possibly even direct injection. Gaseous hydrogen fuel could be injected at multiple different injection locations in certain applications.

Engine 10 may be spark-ignited and includes a plurality of igniters 56, each positioned in one of cylinders 14 to ignite a combustion charge of gaseous hydrogen fuel and pressurized intake air therein. Igniters 56 may include prechamber sparkplugs, prechamber ignition devices having a separate and dedicated supply of a fuel such as the gaseous hydrogen fuel or another fuel, or still other electrically operated ignition mechanisms. Each of fuel admission valves 52 may be electrically actuated such as by an electrical control current that energizes a solenoid-operated valve to start an injection of the gaseous hydrogen fuel, and is deenergized to end an injection of the gaseous hydrogen fuel. As noted above, certain challenges in controlling combustion of gaseous hydrogen fuel in reciprocating internal combustion engines have been observed. As will be further apparent from the following description, engine system 10 is uniquely configured and operated to limit undesired combustion of gaseous hydrogen fuel such as preignition occurring in cylinders 14, backfiring caused by ignition in intake ports 26, or other forms of undesired combustion including undesired phasing of combustion in some instances.

Engine system 8 further includes an engine timing sensor 62 structured to produce an engine timing signal indicative of a position of intake valves associated with cylinders 14, and an injection control unit 64 in a control system 60. Injection control unit 64 may be coupled to engine timing sensor 62 and in control communication with each of fuel admission valves 52. Injection control unit 64 may include any suitable computerized control unit having a central processing unit (CPU) such as a microprocessor, a microcontroller, or another. Injection control unit 64 may be provided with suitable computer readable memory such as RAM, ROM, SDRAM, FLASH, et cetera, storing program control instructions which, upon execution by a computer processor, cause engine system 8 to operate in the manner disclosed herein.

Engine system 8 may be used in a variety of applications including for operating a drivetrain in a mobile land vehicle or a marine vessel, operating a pump or a compressor such as for conveyance or pressurization of gases or liquids, and for electrical power generation. In the illustrated embodiment engine system 8 is coupled to a load 46 including an electrical generator that operates an electric motor. In an electric power application engine system 8 may also be used to provide electric power to a local or regional power grid, or to charge energy storage devices to name a few examples.

Figure 2:
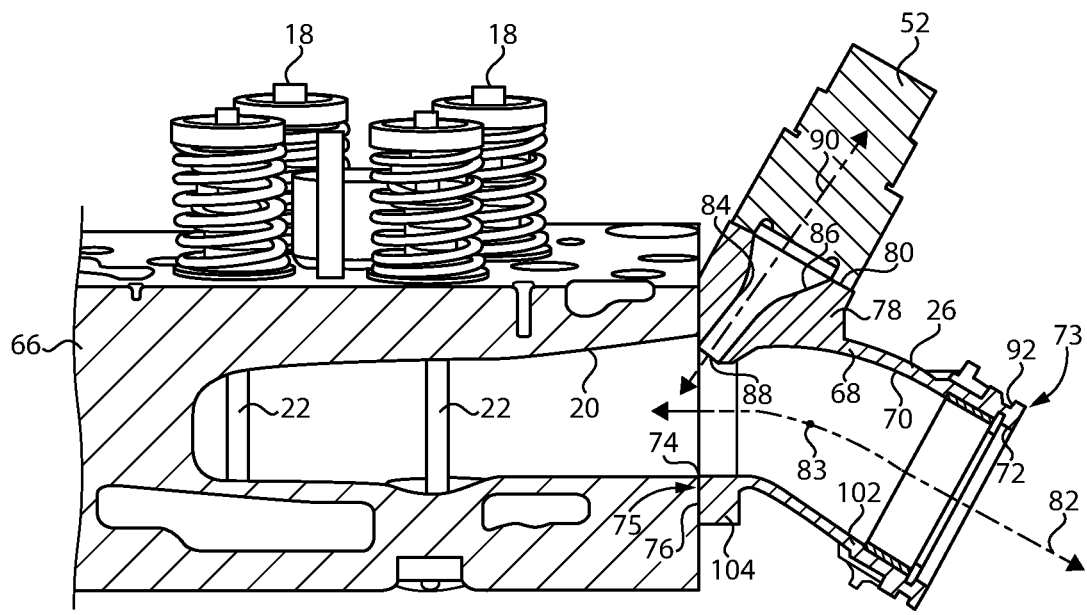
FIG. 2 is a partially sectioned side diagrammatic view of a portion of a gaseous fuel engine system, according to one embodiment.

Referring also now to FIG. 2, there are shown additional features of an example one of intake runners 26. Each intake runner 26, hereinafter referred to, at times, in the singular, includes a conduit 68 forming an intake passage 70 fluidly connected to intake port 20. Intake passage 70 defines an intake passage axis line 82 extending between an upstream runner inlet 72 formed in a manifold end 73 of conduit 68 and a downstream runner outlet 74 formed in an engine end 75 of conduit 68. Conduit 68 further includes a clamping face located at engine end 75 and extending around downstream runner outlet 74. In the illustrated embodiment upstream runner inlet 72 is centered on intake passage axis line 82, and downstream runner outlet 74 is off-center from intake passage axis line 82.

Intake passage axis line 82 can be understood as a curved central axis following a curved contour of intake runner 26 from upstream runner inlet 72 to downstream runner outlet

74. Upstream runner inlet 72 may be circular, and manifold end 73 may include a circumferential groove 92 and/or other attachment and fluid connection features for coupling intake runner 26 to intake manifold 38. Downstream runner outlet 74 may be non-circular, and off-center from intake passage axis line 82 for reasons which will be further apparent from the following description.

Intake runner 26 further includes a valve mount 78 attached to conduit 68 and including a valve mounting face 80. Valve mounting face 80 may be substantially planar and has formed therein a plurality of bolt holes 114. Clamping face 76 may also be substantially planar and includes a plurality of bolt holes 116 formed therein. In the illustrated embodiment valve mount 78 includes a valve mounting flange 118 having valve mounting face 80 formed thereon. Conduit 68 may include a clamping flange 120 having clamping face 76 formed thereon. Also in the illustrated embodiment valve mounting face 80 and clamping face 76 are oriented at an acute angle relative to one another.

Intake runner 26 may further include a hydrogen fuel passage 84 extending from a passage inlet 86 formed in valve mount 78 to a passage outlet 88, hydrogen fuel passage 84 defining a fuel passage central axis 90 extending through each of clamping face 76 and valve mounting face 80, and oriented angularly to at least one of clamping face 76 and valve mounting face 80. Oriented angularly means oriented neither parallel nor perpendicular. In the embodiment of FIG. 2 fuel passage axis 90 is oriented substantially perpendicular to valve mounting face 80 and oriented at an angle to clamping face 76. Hydrogen fuel passage 84 itself may be oriented angularly to at least one of clamping face 76 or valve mounting face 80 and extends from an upstream location of passage inlet 86 to a downstream location of passage outlet 88. Also in the illustrated embodiment, passage inlet 86 may be tapered so as to narrow in a direction of passage outlet 88. Passage inlet 86 could have the form of a conical surface extending circumferentially around fuel passage central axis 90. Gaseous fuel admission valve 52 is mounted upon valve mount 78 and fluidly connected to gaseous hydrogen fuel supply 50.

Figures 3, 4:
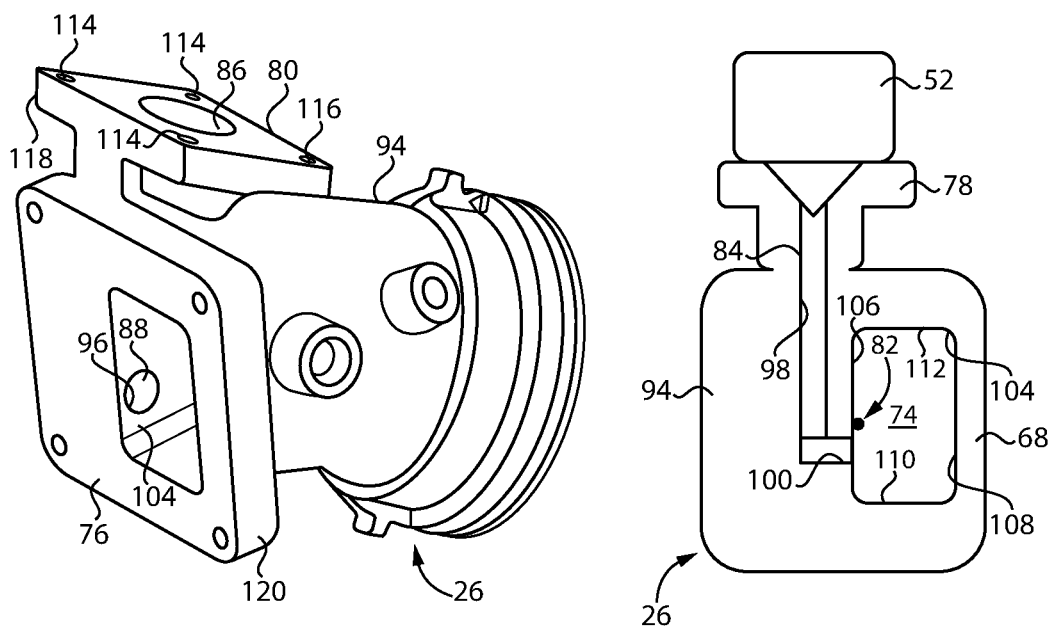
FIG. 3 is a diagrammatic view of an intake runner, according to one embodiment.
FIG. 4 is another diagrammatic view of an intake runner, according to one embodiment.

Referring also now to FIGS. 3 and 4 intake runner 26 may include a one-piece body 94 such as a casting or possibly a forging that forms conduit 68 and valve mount 78. Valve mount 78 and conduit 68 may thus be formed integrally with one another. Hydrogen fuel passage 84 may be formed at least in part by material, such as a cast iron or steel material, of one-piece body 94. In an embodiment hydrogen fuel passage 84 includes an open passage formed entirely by material of one-piece body 94. Conduit 68 may further include an incoming section 102 that forms a relatively larger flow area of intake passage 70 extending from upstream runner inlet 72, and an outgoing section 104 forming a reduced flow area of intake passage 70 extending from incoming section 102 to downstream runner outlet 74. In an embodiment, passage outlet 88 opens to outgoing section 104.

Focusing now on FIG. 4, conduit 68 may include a plurality of internal sidewalls. Within outgoing section 104 a first vertical sidewall 106, a second vertical sidewall 108, a bottom horizontal sidewall 110 and a top horizontal sidewall 112 may define downstream runner outlet 74. Passage outlet 88 may be formed in one of the plurality of sidewalls, as illustrated formed in sidewall 106 and at a location that is upstream of clamping face 76. It will be recalled that downstream runner outlet 74 is off-center relative to intake passage axis line 82. In FIG. 4 material of body 94 can be seen on the left side of the drawing next to downstream runner outlet 74. Hydrogen fuel passage 84 may extend through material of one-piece body 94, traversing at least one turn to exit generally perpendicular to an upstream to downstream flow direction of pressurized intake air through intake runner 26. Hydrogen fuel passage 84 may include a first bore 98 extending from valve mount 78, and a second bore 100 extending in an orientation transverse to first bore 98 to and through the one of the sidewalls 106. As can be seen in FIG. 4 passage outlet 88 may include a fuel port 96 opening to intake passage 70 and formed by material of one-piece body 94.

Returning focus to FIG. 2 there it can be seen that intake passage axis line 82 defines a center point 83. Center point 83 can be understood as the point on intake passage axis line 82 that is half-way along axis line 82 from upstream runner inlet 72 to downstream runner outlet 74. Fuel passage 84 may open to intake passage 70 at a location upstream of clamping face 76 and downstream of center point 83 in some embodiments. In one implementation fuel port 96 may be located just upstream of clamping face 76 and positioned to inject gaseous hydrogen fuel into an incoming stream of pressurized intake air entering intake port 20. In a refinement, fuel port 96 could be located as close as can practically be achieved to clamping face 76 given applicable machining tolerances and preferences. Hydrogen fuel passage 84 and fuel port 96 may be circular, although the present disclosure is not thereby limited. A size of fuel port 96 may be approximately 14 millimeters diameter, although again the present disclosure is not thereby limited. As can be further noted from FIG. 4, fuel port 96 may be located relatively closer to a bottom one of sidewalls 110 than to a top one of sidewalls 112.

Figure 5:
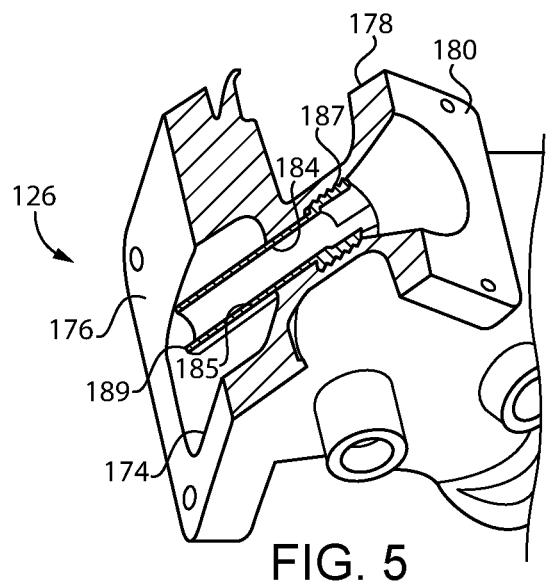
FIG. 5 is another diagrammatic view of an intake runner, according to one embodiment.

Referring now to FIG. 5, there is shown an intake runner 126 according to another embodiment and having certain similarities with embodiments discussed above but certain differences. Intake runner 126 includes a downstream runner outlet 174 and a clamping face 176 extending around downstream runner outlet 174. Intake runner 126 also includes a valve mount 178 which may be similarly configured to valve mount 78 discussed above and having a valve mounting face 180. A fuel passage 184 extends through valve mount 178. In the foregoing embodiments the hydrogen fuel passage 84 is formed as an open passage defined by material of body 94. In the embodiment of FIG. 5 a tube insert 185 is within fuel passage 184 and extends into an intake passage of intake runner 26. Tube insert 185 includes a tip 189 forming a passage outlet. In one embodiment tip 189 extends to a location downstream of clamping face 176. In other embodiments tube insert 185 could have a range of lengths enabling a location of a passage outlet to be selectively positioned relatively more upstream or relatively more downstream. Tube insert 185 may include external threads 187 for securing tube insert 187 in fuel passage 184 or could be paired with an externally threaded clamping nut or the like in some embodiments. Various other attachment strategies including but not limited to interference fits or welding of a tube insert could also be used.

Figure 6:
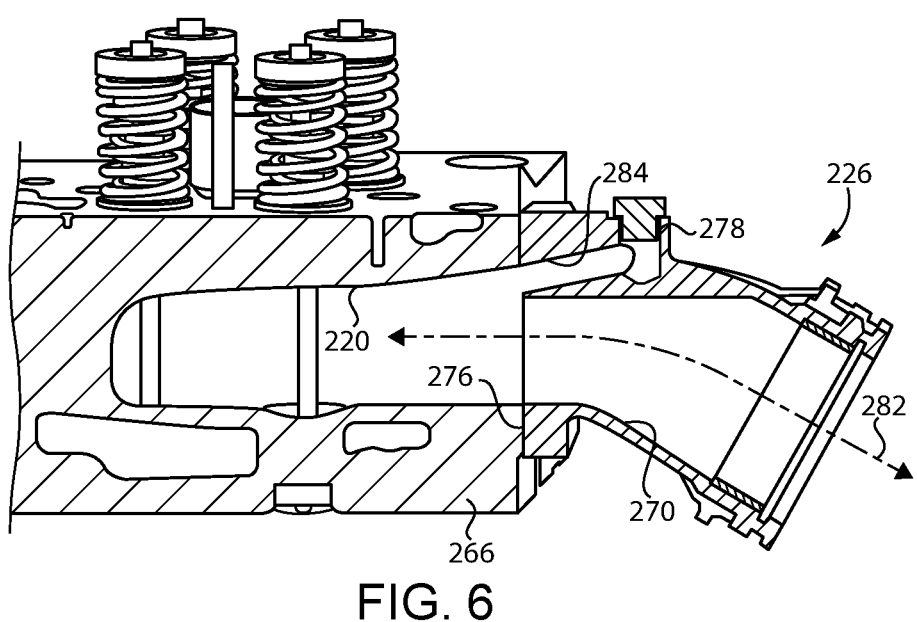
FIG. 6 is a partially sectioned side diagrammatic view of a portion of a gaseous fuel engine system, according to one embodiment.
Figure 7:
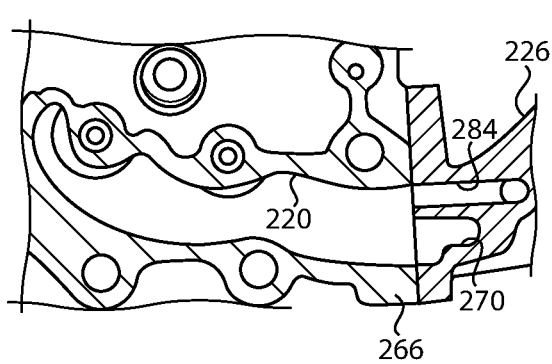
FIG. 7 is a sectioned top diagrammatic view of a portion of a gaseous fuel engine system, as in FIG. 6.

Turning now to FIGS. 6 and 7, there is shown an intake runner 226 attached to an engine head 266 according to yet another embodiment. Intake runner 226 includes an intake passage 270 therein that is fluidly connected to an intake port 220 in engine head 266. Intake port 226 also includes a clamping face 276, a valve mount 278, and a gaseous hydrogen fuel passage 284. Intake port 226 originates in valve mount 278 but differs from intake runners discussed above in that hydrogen fuel passage 284 terminates in clamping face 276. In addition, a location of hydrogen fuel passage 284 may be approximately in an upper left corner of clamping face 276, as it would appear viewing upstream through intake runner 226. Whereas gaseous hydrogen fuel may be injected through a side wall in the embodiment of FIGS. 2-4, and injected through a tube insert extending downstream from the intake runner in the embodiment of FIG. 5, in the embodiment of FIGS. 6 and 7 gaseous hydrogen fuel may be injected at locations between a perimeter of intake passage 270 and an outer perimeter of intake runner 226 itself.

An optimum location of injection of gaseous hydrogen fuel, an angle of injection of gaseous hydrogen fuel, and various other factors may depend upon the design, flow properties, and operating parameters of the subject gaseous fuel engine system, including but not limited to boost pressure or boost pressure range, swirl ratio, internal geometry of the intake runners and intake ports, and arrangement of the intake valves and valve openings connecting the intake ports to the cylinders.

Figure 8:
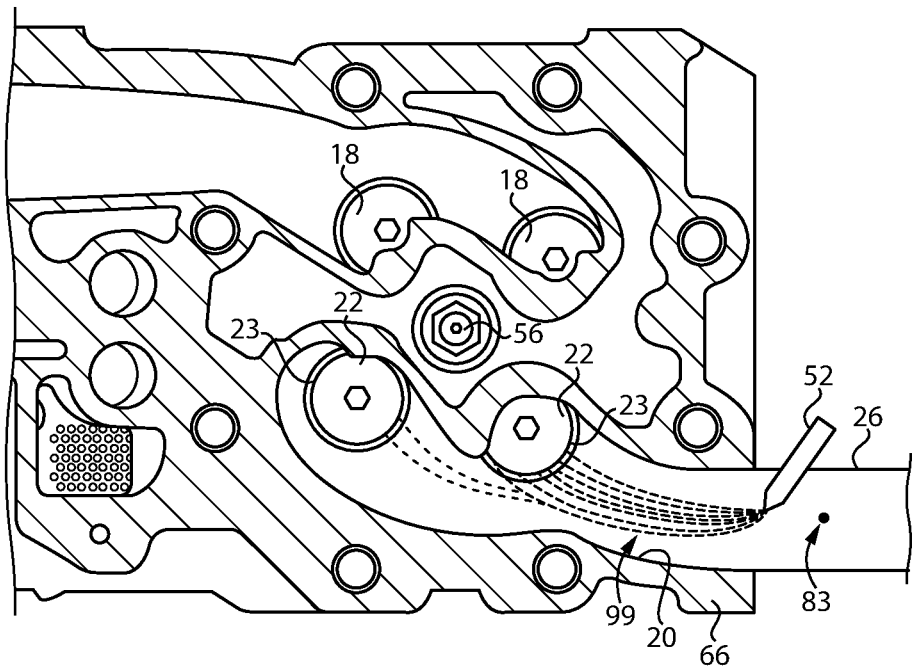
FIG. 8 is a sectioned top diagrammatic view illustrating flow of a gaseous hydrogen fuel admitted into a gaseous fuel engine system, according to a first fuel delivery arrangement.

Turning now to FIG. 8, there is shown engine head 66 as it might appear where gaseous hydrogen fuel has been injected very close to and just upstream of intake port 20 into a stream of pressurized intake air being fed through intake runner 26. It can be seen from FIG. 8 that injected gaseous hydrogen fuel flows with incoming pressurized intake air through intake port 20 to at least one of a plurality of intake openings 23 the opening and closing of which is controlled by way of intake valves 22. An igniter 56 for the associated cylinder is shown generally centrally located among intake valves 22 and exhaust valves 18. Gaseous hydrogen fuel 99 forms a distribution pattern that is biased to the one of intake openings 23 closer to the injection location of the gaseous hydrogen fuel but includes some fuel conveyed to the one of the intake openings further from the injection location. The injection location and injection angle of the gaseous hydrogen fuel may be similar to that of the configuration depicted in FIG. 2, upstream of clamping face 76 and downstream of center point 83.

Figure 9:
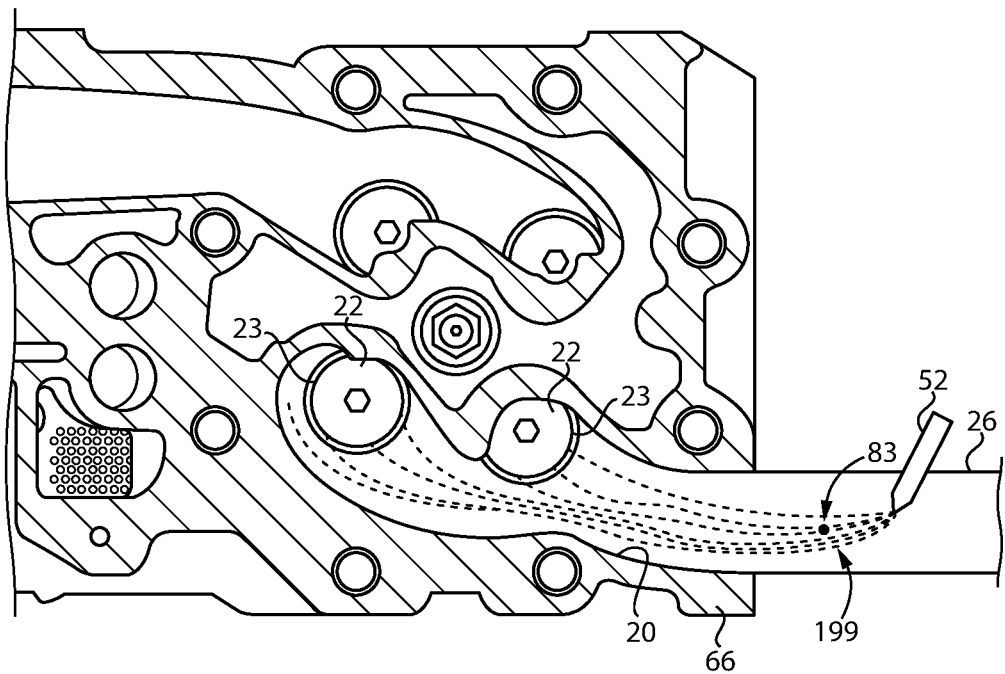
FIG. 9 is a sectioned top diagrammatic view illustrating flow of a gaseous hydrogen fuel admitted into a gaseous fuel engine system, according to a different fuel delivery arrangement.

Referring also to FIG. 9, there is shown engine head 66 as it might appear where gaseous hydrogen fuel is injected into intake runner 26 at a location that is relatively more upstream than the injection location depicted in FIG. 8, including upstream of center point 83. Gaseous hydrogen fuel 199 is shown having been conveyed into intake port 20 and forming a distribution pattern where the gaseous hydrogen fuel is more uniformly supplied to the two intake openings 23.

INDUSTRIAL APPLICABILITY

It has been observed that gaseous hydrogen fuel, due at least in part to its relatively low flammability limit, can pre-ignite in a gaseous fuel engine. Preignition is the ignition of gaseous hydrogen fuel in-cylinder that can occur prior to an intended ignition timing, such as a timing of spark production. Engineers have encountered certain challenges with regard to admitting sufficient gaseous hydrogen fuel into a cylinder without causing preignition. Particularly in engine applications having a relatively high rated load or a relatively wide load range it can be difficult to supply enough fuel energy to satisfy higher load demands without risking preignition. Thus, efforts to simply inject more fuel when load demand is high can cause locally rich regions of hydrogen fuel to form in-cylinder, exceeding the lower flammability limit of hydrogen and pre-igniting.

It has also been observed that increasing mixing of injected hydrogen fuel with air, such as by injecting the hydrogen fuel relatively further upstream of an intake port can enable relatively more fuel to be injected by limiting the formation of locally rich regions that exceed the lower flammability limit of hydrogen. While pre-ignition can sometimes be limited in such instances, injection relatively further upstream of an intake port can result in hydrogen fuel remaining in the intake port and/or the intake runner. Residual fuel that remains in the intake port, or possibly even in the intake runner, can combust after closing of the intake valves resulting in backfire.

According to the present disclosure, it has been discovered that injecting gaseous hydrogen fuel at an optimum location at or very close to where the intake runner connects to the intake port can balance a port fuel residual amount with a distribution pattern of the gaseous hydrogen fuel to a plurality of intake openings based on the selected injection location. As a result, the likelihood of both pre-ignition due to locally rich regions in-cylinder and backfire due to fuel remaining in the fuel port can be minimized. It has further been discovered that injecting gaseous hydrogen fuel at an injection angle to an upstream to downstream flow direction of intake air can assistance in furtherance of these goals, providing for some mixing that reduces likelihood of pre-ignition whilst also advancing the injected hydrogen fuel in a direction of the intake port. Both FIGS. 8 and 9 illustrate an injection angle that falls between perpendicular to a flow direction of the incoming intake air and parallel to a flow direction of the incoming intake air.

As can be noted from comparing FIG. 8 to FIG. 9, where an injection location is selected that is relatively more downstream (FIG. 8 example) relatively less mixing of the injected fuel with intake air can occur, however, some gaseous hydrogen fuel flows to each intake opening and very little, if any, residual hydrogen fuel will remain in the intake runner or likely the intake port. Where an injection location is selected that is relatively more upstream (FIG. 9 example) relatively greater mixing can occur and the fuel will travel to both intake openings, however, some fuel may remain in the intake port or the intake runner after the intake valves close. Various alternatives and extensions of these general principles including variations to injection angle, variations to fuel port size or shape or fuel port angle, and still others may be envisioned that balance port residual fuel amount with distribution pattern of the injected gaseous hydrogen fuel to a plurality of intake openings to a cylinder.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A gaseous fuel engine system comprising:
 a gaseous hydrogen fuel supply;
 an engine housing having formed therein a cylinder, and
  an intake port extending to the cylinder;

an intake runner including a conduit forming an intake passage fluidly connected to the intake port and extending from an upstream runner inlet to a downstream runner outlet, and the conduit including a clamping face forming the downstream runner outlet;

the intake runner further including a valve mount attached to the conduit and including a valve mounting face;

a hydrogen fuel passage extending from a passage inlet formed in the valve mount to a passage outlet, and the hydrogen fuel passage being oriented angularly to at least one of the clamping face or the valve mounting face and extending from an upstream location of the passage inlet to a downstream location of the passage outlet, the hydrogen fuel passage being disposed between a perimeter of the intake passage and an outer perimeter of the intake runner; and a gaseous fuel admission valve mounted upon the valve mount and fluidly connected to the gaseous hydrogen fuel supply.

2. The engine system of claim 1 wherein the intake runner includes a one-piece body forming the conduit and the valve mount, and the hydrogen fuel passage is formed at least in part by material of the one-piece body.

3. The engine system of claim 2 wherein the passage outlet includes a fuel port opening to the intake passage and formed by material of the one-piece body.

4. The engine system of claim 1 wherein the conduit includes an incoming section forming a larger flow area of the intake passage extending from the upstream runner inlet, and an outgoing section forming a reduced flow area of the intake passage extending to the downstream runner outlet.

5. A gaseous fuel engine system comprising:

a gaseous hydrogen fuel supply;

an engine housing having formed therein a cylinder, and an intake port extending to the cylinder;

an intake runner including a conduit forming an intake passage fluidly connected to the intake port and extending from an upstream runner inlet to a downstream runner outlet, and the conduit including a clamping face forming the downstream runner outlet;

the intake runner further including a valve mount attached to the conduit and including a valve mounting face;

a hydrogen fuel passage configured to contact the gaseous hydrogen and extending from a passage inlet formed in the valve mount to a passage outlet, and the hydrogen fuel passage being oriented angularly to at least one of the clamping face or the valve mounting face and extending from an upstream location of the passage inlet to a downstream location of the passage outlet;

a gaseous fuel admission valve mounted upon the valve mount and fluidly connected to the gaseous hydrogen fuel supply; and wherein the intake runner includes a one-piece body forming the conduit and the valve mount, and the hydrogen fuel passage is formed entirely by material of the one-piece body.

6. The engine system of claim 5 wherein the passage outlet includes a fuel port opening to the intake passage and formed by material of the one-piece body.

7. The engine system of claim 5 wherein the conduit includes an incoming section forming a larger flow area of the intake passage extending from the upstream runner inlet, and an outgoing section forming a reduced flow area of the intake passage extending to the downstream runner outlet.

8. A gaseous fuel engine system comprising:

a gaseous hydrogen fuel supply;

an engine housing having formed therein a cylinder, and an intake port extending to the cylinder;

an intake runner including a conduit forming an intake passage fluidly connected to the intake port and extending from an upstream runner inlet to a downstream runner outlet, and the conduit including a clamping face forming the downstream runner outlet, the conduit includes an incoming section extending from the upstream runner inlet, and an outgoing section extending to the downstream runner outlet, a plurality of sidewalls forming the outgoing section;

the intake runner further including a valve mount attached to the conduit and including a valve mounting face;

a hydrogen fuel passage extending from a passage inlet formed in the valve mount to a passage outlet, and the hydrogen fuel passage being oriented angularly to at least one of the clamping face or the valve mounting face and extending from an upstream location of the passage inlet to a downstream location of the passage outlet, the passage outlet is formed in one of the sidewalls at a location that is upstream of the clamping face and opens to the outgoing section of the conduit;

a gaseous fuel admission valve mounted upon the valve mount and fluidly connected to the gaseous hydrogen fuel supply; and wherein the hydrogen fuel passage includes a first bore extending from the valve mount, and a second bore extending to the one of the sidewalls in an orientation transverse to the first bore.

9. The engine system of claim 8 wherein the incoming section of the conduit forms a larger flow area of the intake passage, and the outgoing section of the conduit forms a reduced flow area of the intake passage.

10. The engine system of claim 8 wherein the intake runner includes a one-piece body forming the conduit and the valve mount, and the hydrogen fuel passage is formed at least in part by material of the one-piece body.

11. The engine system of claim 10 wherein the passage outlet includes a fuel port opening to the intake passage and formed by material of the one-piece body.

12. An intake runner for a gaseous fuel engine comprising:

a conduit including a manifold end for attaching to an intake manifold and an engine end for attaching to an engine, and forming an intake passage defining an intake passage axis line extending between an upstream runner inlet formed in the manifold end and a downstream runner outlet formed in the engine end;

the conduit further including a clamping face located at the engine end and extending around the downstream runner outlet;

a valve mount attached to the conduit and including a valve mounting face;

a fuel passage extending between the valve mount and the engine end;

the upstream runner inlet is centered on the intake passage axis line, and the downstream runner outlet is off-center from the intake passage axis line; and the fuel passage defining a fuel passage axis extending through each of the clamping face and the valve mounting face, and oriented angularly to at least one of the clamping face or the valve mounting face.

13. The intake runner of claim 12 wherein the fuel passage includes a passage inlet formed in the valve mounting face, and a passage outlet, and wherein the valve mount includes a plurality of bolt holes arranged around the passage inlet, and the clamping face includes a plurality of bolt holes arranged around the downstream runner outlet.

14. The intake runner of claim 13 wherein the intake runner includes a one-piece body, and the passage outlet opens to the intake passage and is formed by material of the one-piece body.

15. The intake runner of claim 12 wherein the conduit includes an incoming section forming a larger flow area of the intake passage extending from the upstream runner inlet, and an outgoing section forming a reduced flow area of the intake passage extending to the downstream runner outlet, and wherein the fuel passage opens to the intake passage within the outgoing section.

16. The intake runner of claim 15 wherein the intake passage axis line defines a center point, and the fuel passage opens to the intake passage at a location upstream of the clamping face and downstream of the center point.

17. The intake runner of claim 16 wherein the conduit includes a plurality of sidewalls forming the outgoing section, and the fuel passage includes a passage outlet formed in one of the sidewalls.

18. The intake runner of claim 17 wherein the fuel passage includes a first bore extending from the valve mount, and a second bore extending in an orientation transverse to the first bore through the one of the sidewalls to the passage outlet.

19. The intake runner of claim 12 wherein the valve mount includes a valve mounting flange having the valve mounting face formed thereon, and the conduit includes a clamping flange having the clamping face formed thereon, and the valve mounting face and the clamping face are oriented at an acute angle to one another.

20. The intake runner of claim 19 further comprising a tube insert within the fuel passage, the tube insert extending into the intake passage and forming the passage outlet.

* * * * *